(No Model.)
W. W. KILBORN.
LOCKING DEVICE IN EXTENSION CHANDELIERS.
No. 383,815. Patented May 29, 1888.
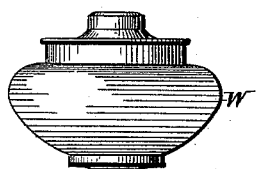
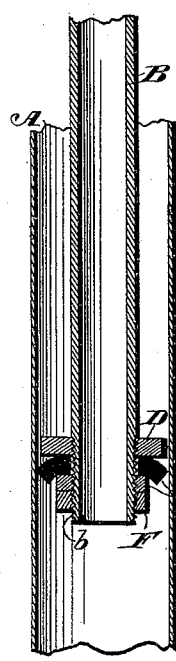
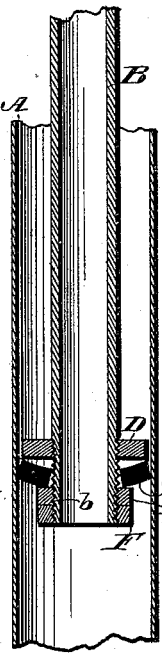
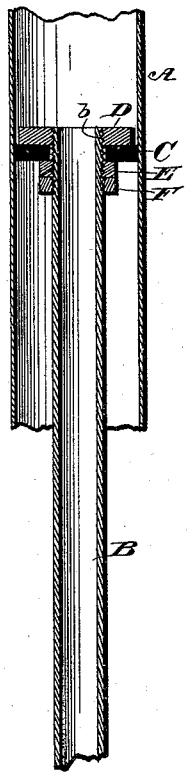
Witnesses:
Robt. Corbett.
Frank V. Shaw.
Inventor:
William W. Kilborn.
By Wm. H. Babcock,
Atty.

UNITED STATES PATENT OFFICE.

WILLIAM W. KILBORN, OF MERIDEN, CONNECTICUT, ASSIGNOR TO THE CHARLES PARKER COMPANY, OF SAME PLACE.

LOCKING DEVICE IN EXTENSION-CHANDELIERS.

SPECIFICATION forming part of Letters Patent No. 383,815, dated May 29, 1888.

Application filed November 30, 1887. Serial No. 256,496. (No model.)

*To all whom it may concern:*

Be it known that I, WILLIAM W. KILBORN, a citizen of the United States, residing at Meriden, in the county of New Haven and State of Connecticut, have invented certain new and useful Improvements in Locking Devices in Extension Chandeliers; and I do hereby declare the following to be a full, clear, and exact description of the invention, such as will enable others skilled in the art to which it appertains to make and use the same.

The object of this invention is to provide extension-chandeliers and parlor-lamps with simple, cheap, and effective devices for automatically resisting the motion of the extensible rod or tube in one direction, though allowing it in the other. To effect this I provide the inner rod or tube with a washer somewhat larger than the interior diameter of the outer tube, or of at least equal diameter, and devices which allow it to yield in one direction but prevent it from yielding in the other. These devices are preferably nuts, and the inner rod or tube is screw-threaded to receive them. This construction of course allows the washer to be held more or less tightly between the nuts, so that its frictional action may be conveniently regulated.

In the accompanying drawings, Figure 1 represents a side elevation of a parlor extension-lamp embodying my invention, the outer tube being partly broken away. Fig. 2 represents on a larger scale a vertical section of a part of the outer and inner tubes and the automatic locking devices, the washer being in position taken by it when the inner tube moves upward. Fig. 3 represents a view similar to Fig. 2, showing the washer in the position which it takes when resisting the downward motion of the inner tube. Fig. 4 represents a detail sectional view, on a scale similar to Figs. 2 and 3, of the corresponding part of an extension-chandelier.

A designates the outer tube, B the inner tube, and C the locking-washer in all the figures.

In Fig. 1, V designates the supporting-frame, to which the outer tube, A, is attached; and W, the lamp mounted on the upper end of the inner tube, B. The end of this latter tube, which is within the outer tube, is screw-threaded at $b$, this screw-threaded end being the lower end in Figs. 1, 2, and 3, and the upper end in Fig. 4. Three nuts, D, E, and F, are employed. The first and largest is of nearly the inner diameter of the outer tube, A, and is above the washer C. The nut E is much smaller and is below the said washer. The third nut, F, arranged below E, is merely a jam-nut for keeping the latter in place.

When the tube B is drawn or pushed up, the washer C bends easily over the small nut E, (see Fig. 2,) and yields so as to interpose no appreciable obstacle; but when the tube B tends to fall the washer turns but a little way in the other direction, being stopped by the large nut D, as shown in Fig. 3. It then is of sufficient diameter to resist the downward motion of said inner tube by its contact with the inner face of the outer tube. When the washer becomes worn so as no longer to bind tightly on the latter, the nut E may be screwed up a little closer to nut D, bringing the washer with it, and thereby lessening the amount of upward curvature allowed to said washer. This operation also serves to tighten the washer and increase friction, irrespective of wear.

In the description above given I have referred to the inner tube as movable and to the other as relatively stationary; but it is evident that the same locking devices may be employed when this is reversed; also, the locking may take place when the movable tube is drawn upward, and the said tube may be left free to move downward, it being only necessary to reverse the relative positions of the larger and smaller nuts. Of course a solid rod may be employed instead of the inner tube. The nuts D and E are in effect stops or shoulders for bracing the washer and determining its amount of movement. Any flexible material of sufficient tenacity may be used for the washer.

Having thus described my invention, what I claim as new, and desire to secure by Letters Patent, is—

1. In combination with the outer tube and inner tube of an extension lamp or chandelier, an adjustable washer surrounding the inner tube, and adjustable devices above and below said washer, the latter operating by friction against the outer tube to prevent accidental descent of the lamp, substantially as set forth.

2. In combination with the outer tube of an extension lamp or chandelier, and the inner tube thereof, having a larger and a smaller stop or shoulder on it, a flexible washer located between said stops or shoulders and operating substantially as set forth.

3. An outer extension lamp or chandelier tube and an inner extension lamp or chandelier tube, the latter being screw-threaded at one end, in combination with nuts D and E, of different diameters, on this screw-threaded end, and a flexible washer arranged between them, substantially as set forth.

In testimony whereof I affix my signature in presence of two witnesses.

WILLIAM W. KILBORN.

Witnesses:
RALPH A. PALMER,
DEXTER W. PARKER.